United States Patent [19]

Booher

[11] Patent Number: 4,753,456
[45] Date of Patent: *Jun. 28, 1988

[54] VEHICLE SUSPENSION SYSTEM WITH FLEXIBLE CONTROL ARM

[76] Inventor: Benjamin V. Booher, 1721 Aldersgate, Leucadia, Calif. 92024

[*] Notice: The portion of the term of this patent subsequent to Apr. 9, 20002, has been disclaimed.

[21] Appl. No.: 60,964

[22] Filed: Jun. 15, 1987

Related U.S. Application Data

[63] Continuation of Ser. No. 835,187, Mar. 3, 1986, abandoned, which is a continuation-in-part of Ser. No. 717,791, Mar. 29, 1985, abandoned, which is a continuation of Ser. No. 525,011, Aug. 22, 1983, Pat. No. 4,509,774.

[51] Int. Cl.$^4$ .................. B60G 11/08; B60G 3/06
[52] U.S. Cl. ............................. 280/697; 280/688; 280/694
[58] Field of Search ............... 280/688, 689, 690, 694, 280/669, 619, 664, 697; 267/47, 148, 149, 151

[56] References Cited

U.S. PATENT DOCUMENTS

| | | | |
|---|---|---|---|
| 2,635,894 | 4/1953 | Jackman | 280/664 |
| 3,034,802 | 5/1962 | Axtmann | 280/694 |
| 4,540,197 | 9/1985 | Finn | 280/697 |
| 4,557,500 | 12/1985 | Collard et al. | 280/719 |

FOREIGN PATENT DOCUMENTS 2528364 12/1983 France ................. 280/697

OTHER PUBLICATIONS

"Operation Seville–An Experiment in Weight Reduction conducted by the Fiber Glass Division of PPG Industries".

*Primary Examiner*—Richard A. Bertsch
*Attorney, Agent, or Firm*—Baker, Maxham & Jester

[57] ABSTRACT

An elongate metal cross-member is connected to and extends transversely across a vehicle frame. A pair of elongate composite control arms are connected to opposite ends of the cross-member by mounting mechanisms which control and guide the flexing of the control arms to prevent failure thereof. Wheel hub assemblies are connected to the outer ends of the control arms. A shock absorber is connected between each one of the wheel hub assemblies and the vehicle frame to dampen oscillations. The control arms may be made of reinforcing glass or graphite fibers held together with a thermoset resin binder and formed by the pultrusion process.

19 Claims, 3 Drawing Sheets

VEHICLE SUSPENSION SYSTEM WITH FLEXIBLE CONTROL ARM

CROSS-REFERENCE TO RELATED APPLICATIONS

This is a continuation of co-pending application Ser. No. 835,187 filed on Mar. 3, 1986 now abandoned, which is a continuation-in-part of my prior pending U.S. patent application Ser. No. 717,791 filed Mar. 29, 1985 entitled "Vehicle Suspension System with Flexible Control Arm" now abandoned which was in turn a continuation of my earlier U.S. patent application Ser. No. 525,011 filed Aug. 22, 1983 entitled "Composite Control Arm Apparatus" and now U.S. Pat. No. 4,509,774 granted Apr. 9, 1985.

BACKGROUND OF THE INVENTION

The present invention relates to vehicle suspension systems, and more particularly, to an automotive suspension system in which a composite elongate member functions as both a control arm and a spring to thereby reduce the weight and number of part otherwise required.

Vehicle suspension systems have heretofore included shock absorbers, springs (coil, leaf, air or torsion bar), axle housings, torque arms, A-frames, anti-roll bars, stabilizers, and so forth. These components have been assembled in various combinations to produce the desired ride and handling characteristics of the vehicle. In a typical suspension system, changes in the spacing between axles and the body/chassis are cushioned by springs, Spring vibration is limited by dampers which are usually called shock absorbers. The shock absorbers dissipate the energy stored in the springs by gradually forcing oil through orifices and valves. The flow resistance encountered by the oils results in compression and rebound forces which control the spring movement. The work done by the oils as it moves through the valves converts energy stored in the springs into heat which is dissipated from the shock absorbers into the surrounding air.

There is a continuing effort to reduce the manufacturing cost of automobiles. There is also a continuing effort to increase the mileage of automobiles through weight reduction. Both of the aforementioned efforts must not unduly sacrifice performance or reliability. Conventional suspension systems tend to have numerous expensive heavy metal parts. It would be desirable to reduce the cost, weight and complexity of existing suspension systems.

U.S. Pat. Nos. 1,679,853 of Cottin; 2,126,130 of Nallinger; 2,157,773 of Probst; 2,177,897 of Lee; and 2,697,613 of Giacosa disclose various automobile suspension systems utilizing transverse leaf springs. Canadian Patent No. 954,149 discloses a fiber reinforced composite leaf spring. U.S. Pat. No. 4,557,500 discloses an automobile suspension system utilizing a transverse composite leaf spring. The leaf spring is mounted to the chassis on opposite sides thereof.

U.S. Pat. No. 2,635,894 discloses a lower control arm 9 forming one leg of a relatively thin and wide L-shaped plate 10 of spring steel or "equivalent elastically flexible material." The portion of the plate inside the frame serves as a torsion spring and not the arm 9 itself.

French Patent No. 2,528,364 discloses twin fiberglass trailing arms for rear wheel suspension. The fiberglass arms can have two layers.

SUMMARY OF THE INVENTION

It is therefore the primary object of the present invention to provide an improved vehicle suspension system.

Another object of the present invention is to provide a vehicle suspension system in which a single flexible control arm replaces a rigid control arm, separate spring and bushings.

Another object of the present invention is to provide an improved composite control arm construction for use in a vehicle suspension system.

According to the illustrated embodiment of the present invention, an elongate metal cross-member is connected to and extends transversely across a vehicle frame. A pair of elongate composite control arms are connected to opposite ends of the cross-member by mounting mechanisms which control and guide the flexing of the control arms to prevent failure thereof. Wheel hub assemblies are connected to the outer ends of the control arms. A shock absorber is connected between each one of the wheel hub assemblies and the vehicle frame to dampen oscillations. The control arms may be made of reinforcing glass or graphite fibers held together with a thermoset resin binder and formed by the pultrusion process.

DESCRIPTION OF THE PREFERRED EMBODIMENT

The entire disclosure of my co-pending U.S. patent application Ser. No. 729,474 filed May 1, 1985 and entitled "Composite Transverse Beam and Spring System for an Automobile" is specifically incorporated herein by reference.

Figure 1:
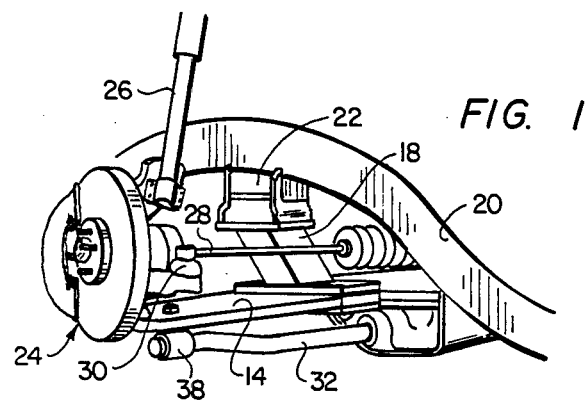
FIG. 1 is a perspective view of a preferred embodiment of my invention.
Figure 5:
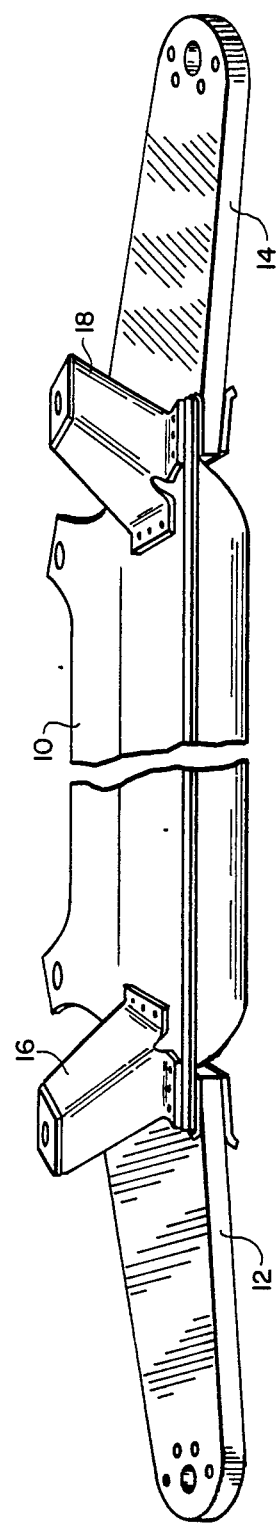
FIG. 5 is a perspective view of the upper side of the cross-member and connected control arms.

Referring to FIG. 5, the preferred embodiment of my invention includes an elongate cross-member 10 having composite control arms 12 and 14 connected to the opposite ends thereof. Mounting posts 16 and 18 extend vertically from each end of the cross-member 10. Referring to FIG. 1, the cross-member is connected to the front end of a vehicle frame such as chassis 20 and extends transversely across the width of the chassis. The cross-member could also be attached to a frame in the form of a uni-body construction. The upper ends of each mounting post, such as 18 are bolted to mounting blocks such as 22 which extend downwardly from the chassis 20. A wheel hub assembly such as 24 is bolted to the upper side of the outer end of each control arm such as 14. Each wheel assembly is also connected to the lower end of a shock absorber such as 26, the upper end of which is pivotally connected to the chassis 20. A steering linkage such as 28 is connected to a steering knuckle 30 of the wheel hub assembly 24.

Referring still to FIG. 1, as the vehicle is driven, the composite control arm 14 functions as a spring to permit the wheel assembly 24 to move upwardly and downwardly to cushion the ride. The shock absorber 26 functions as a damper and prevents oscillations of the wheel assembly and composite spring that would otherwise occur in its absence.

Figure 4:
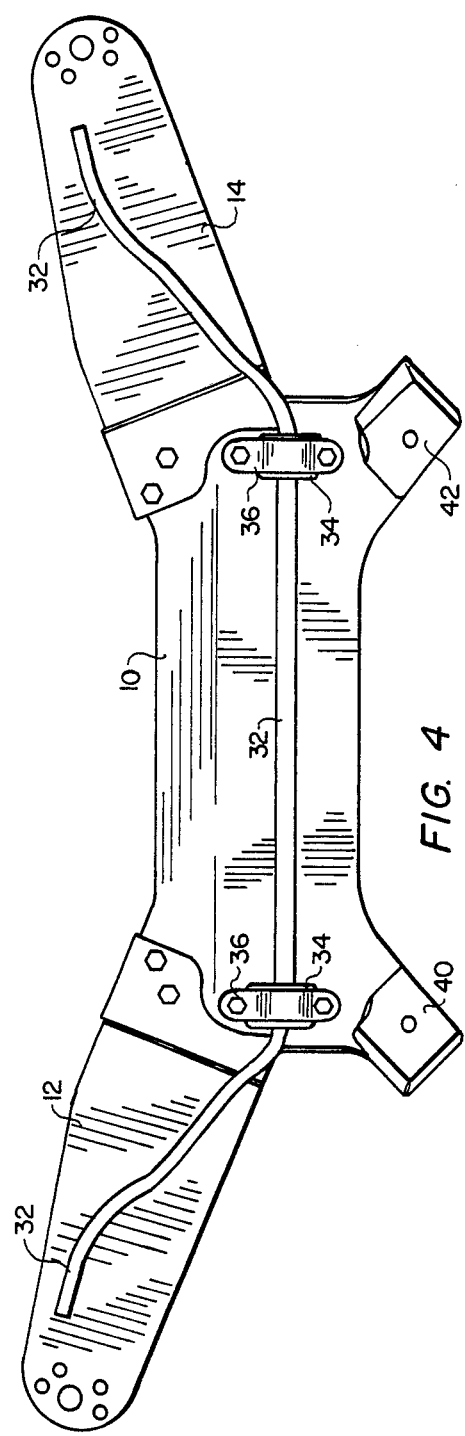
FIG. 4 is a bottom view of the cross-member with the composite control arms connected thereto at each end and further illustrating the sway bar of the preferred embodiment of my invention.

Referring to FIG. 4, a sway bar 32 extends transversely beneath the cross-member 10 and each of the composite control arms 12 and 14. The sway bar is preferably made of steel. It has a straight intermediate segment whose opposite ends extend through deformable bushings 34 held inside brackets 36 bolted to the underside of the cross-member. The bushings and brackets thus provide a means for resiliently and rotatably connecting the sway bar to the cross-member. The ends of the sway bar 32 extend forwardly from its straight intermediate segment, beneath corresponding ones of the control arms. As illustrated in FIG. 1, the terminal ends of the sway bar are each received in a cylindrical socket, such as 38. Each socket is in turn bolted to the underside of the outer end of the corresponding composite control arm. It will be readily understood by those skilled in the art that when the vehicle goes through a turn the inside wheel assembly tends to move downwardly relative to the vehicle body. The sway bar 32 functions to pull the outside wheel assembly downwardly also, thereby inhibiting undesirable rolling of the vehicle body.

Figure 2:
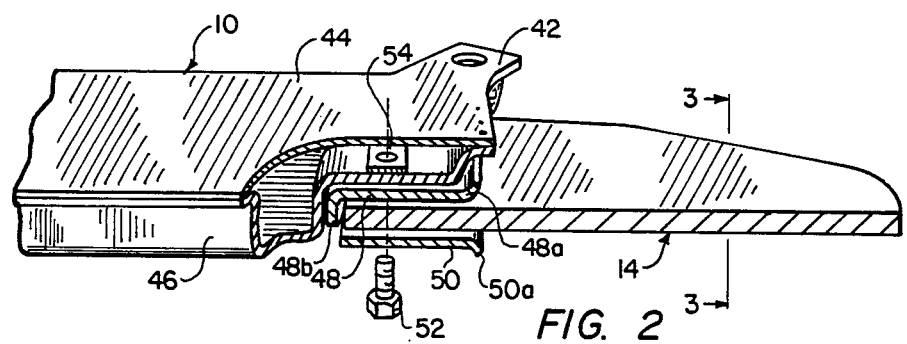
FIG. 2 is a perspective view, with portions broken away, illustrating the manner in which a composite control arm is mounted to a cross-member in accordance with the preferred embodiment of my invention.

Referring to FIG. 4, the cross-member 10 has a generally K-shaped configuration and includes legs 40 and 42 which are bolted to the vehicle chassis 20. Referring to FIG. 2, the cross-member 10 has a monocoque construction including and upper metal plate 44 which is welded or otherwise rigidly connected to a lower metal box-shaped element 46. The mounting posts 16 and 18 (FIG. 5) are similarly made of metal and are welded or otherwise rigidly connected to the upper metal plate 44.

My invention includes special means for mounting the inner ends of the composite control arms to the ends of the rigid cross-member to control the flexing of the remaining portions of the control arms in a manner that will reduce the likelihood of critical failure of the composite material. In the illustrated embodiment, this mounting means includes upper and lower horizontal metal clamp plates 48 and 50 which are firmly held in clamping relation about the inner end of the corresponding composite control arm by bolts such as 52. These bolts extend through holes in the clamp plates and the control arm and are threaded into nut blocks such as 54 welded to the upper side of the box-shaped element 46 of the cross-member. The outer edge portions 48a and 50a of the clamp plates are curved upwardly and downwardly, respectively, to thereby provide smooth gradual guides which are engaged by the adjacent surfaces of the control arm during upward and downward deflection of its outer portion. The radius of curvature of these outer edge portions 48a and 50a is selected for optimum control of the flexing of the control arm depending upon its material, the loading and the overall geometry of the suspension system. The edge portion 48a may have a graduated curvature or stepped configuration to provide a progressive or overload spring rate. The inner edge portion 48b of the upper clamp plate is bent downwardly in a vertical direction and provides a lateral abutment surface for the inner end edge of the control arm.

Figure 6:
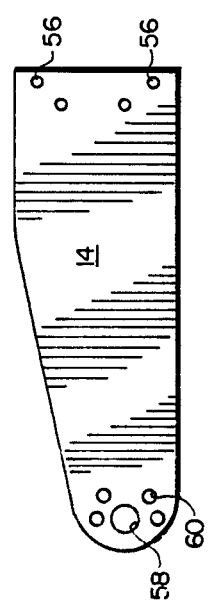

Referring to FIG. 6, each control arm of the preferred embodiment, such as 14, is a generally asymmetrical planar member with a substantially constant or uniform thickness throughout its area. The control arm 14 tapers gradually in width from the inner end to the outer end thereof, the inner end having the greatest width. Holes 56 in the inner end of the control arm receive the mounting bolts 52 that hold the clamp plates on either side of the control arm. A larger hole 58 in the outer end of the control arm receives a mounting attachment of the corresponding wheel hub assembly. Smaller holes 60 in the outer end of the control arm receive the bolts that attach the sway bar socket 38 and secure the wheel hub assembly.

Figure 7:
FIGS. 6 and 7 are plan views of alternate shapes for the composite control arm.

FIG. 7 illustrates an alternate symmetrical configuration 62 for the composite control arms. The shape of the control arm and the thickness thereof are a function of the geometry of the system, the expected loading and the properties of the composite material from which the control arm is made.

Figure 3:
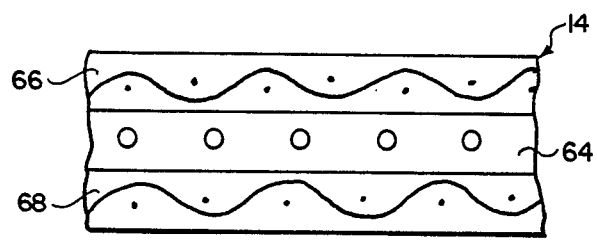
FIG. 3 is a diagrammatic cross-sectional view of a portion of the composite control arm of my invention, take along line 3—3 of FIG. 2.

Clearly, the selection of the proper composite material is a very important factor in determining the cost and durability of my suspension system. Referring to FIG. 3, each control arm of my suspension system is preferably made of reinforcing fibers held together with a suitable binder such as a catalyzed thermoset resin. There is an intermediate layer 64 of uni-directional fibers which extend along the length of the flexible control arm (left to right in FIG. 2). The intermediate layer is surrounded by upper and lower woven fiber layers 66 and 68. The control arm may be fabricated by laminating separate resin impregnated fibers, but is more preferably manufactured according to a pultrusion process illustrated diagrammatically in FIG. 8. Suitable resins include vinyl ester resin, filled epoxy resin, unfilled epoxy resin, and polyimide resin. Suitable reinforcing fibers may be made of E-type glass, S-type glass or graphite. The foregoing listing of materials is intended to be exemplary and not exclusive. The pultrusion process results in a continuous body of material with a uniform rectangular cross-section. Individual lengths of the material may be cut off and tooled to provide the perimeter configuration of FIGS. 6 and 7 or some other perimeter configuration. The mounting holes may be drilled or routed.

Pultrusion is a primary fabrication process for making continuous-length filament-reinforced plastic composite profiles. Reinforcing filaments, such as glass fiber roving, saturated with catalyzed thermoset resin, are continuously pulled through a shaped orifice in a heated steel die. As the two materials, filaments and resin, pass through the die, polymerization of the resin occurs to continuously form a rigid cured profile corresponding to the die orifice shape. As in extrusion the emerging end product is a constant cross-sectional shape and of unlimited length, but instead of being pushed through a die, the materials are pulled through, a feature from which the process name "pultrusion" was coined.

Pultrusion machines are commercially available. Typically they consist of six in-line stations: (1) filamental raw material dispensing creels, (2) resin impregnation tank, (3) excess resin removal devices, (4) heated die zone, (5) gripping/pulling device, and (6) cutoff saw.

Figure 8:
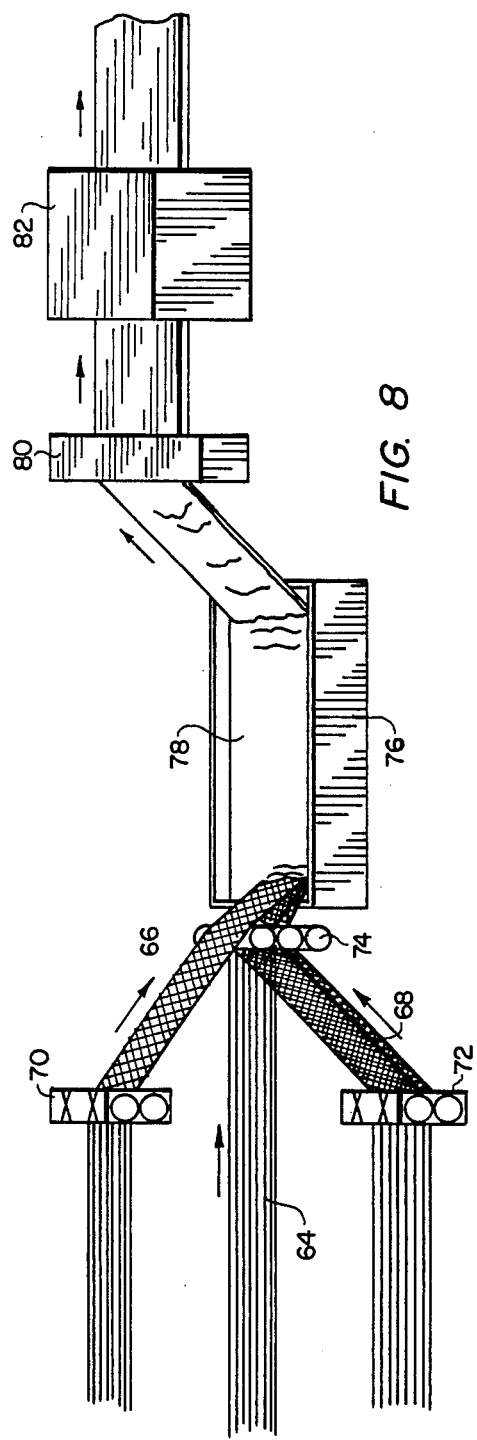
FIG. 8 is a diagrammatic illustration of the pultrusion process for making continuous-length filament reinforced plastic composite profiles from which the control arms of FIGS. 6 and 7 may be tooled.

FIG. 8 illustrates the steps involved in fabricating the composite arms of my preferred embodiment. Glass or other fibers are fed to weaving apparatus 70 and 72 which form the upper and lower woven fiber layers 66 and 68. The longitudinal uni-directional intermediate fiber layer 64 is positioned between the woven layers 66 and 68. The three layers 64, 66 and 68 are propelled by rollers 74 through a tank 76 filled with resin 78.

The resin 76 is a relatively long trough that allows a reasonably long fiber residence time, e.g., 1 minute, in the resin to achieve full resin wetout and displacement of air in the fiber layers. As the resin-wet fiber layers emerge from the tank 76, excess resin is stripped from the stream of material in progressive stages by apparatus 80 to eliminate the accumulation of viscous shear forces which tend to disturb and tangle the reinforcing fibers.

The product then passes into the heated-die cure station 82 which in its simplest form consists of a steel die approximately 30 inches long with the cross-sectional dimensions determined by the profile orifice, plus enough metal surrounding it to support the expansion forces generated during the resin polymerization. The steel die may be heated with electric resistance strip heaters attached to the outside surface of the die to achieve product exit temperatures of 300 to 350 degrees F. for polyesters.

The central feature of the pultrusion process is the control of the chemical reaction of resin and catalyst under the influence of heat such that the resin gelation point and the peak exotherm point both occur inside the steel die while the curing mass is continuously moving. Failure to do so results in incomplete cure, exotherm occurring outside the confines of the die, and quality deterioration in the form of cracks in the profile.

To increase product throughput speeds, dielectric preheating of the resin-wet fibers prior to entry into the steel die may be used for unidirectional glass fiber roving products. Unlike thermal heating, which is governed by conductivity, dielectric (radio frequency) heating occurs instantaneously throughout the profile cross section, regardless of mass. Since less of the steel die length is used to reach the resin gelation point temperature, the material residence time in the die is shortened, which results in greater speeds. Increasing the die length is another method of increasing material residence time, but length limitations are quickly reached since frictional loads are directly proportional to die length.

The primary mechanical feature of a pultrusion machine is its gripper/puller system. Because of the precision required to hold the cure points within the die while moving at high speeds, the pullers must be accurately controlled. Slippage or speed variations cannot be tolerated.

Two fundamentally different gripper/puller systems may be used: (1) opposed-tread caterpillar tractor type, and (2) hand-to-hand reciprocating clamps. The caterpillar type employs two constantly rotating, opposed, cleated belts between which the cured profile is pulled. While basically less costly than reciprocating clamps because no motion sequencing is involved, caterpillar pullers have the distinct disadvantage of requiring, for complex profiles, a relatively large number of specially shaped gripping pads covering both upper and lower tread surfaces, each often totaling more than eight lineal feet.

A more significant disadvantage is evident when pulling large profiles and heavy loads approximating 10,000 lb. Because the gripping force cannot be isolated from the pulling force, these substantial gripping loads are thrown into the bearings of the rotating pulling mechanism creating an undesirable condition.

The reciprocating clamp system eliminates both problems inherent in the tractor belt puller. Using only two pairs of shaped pads approximately two feet long surrounding the profile, one reacting against the other hydraulically, with the profile between, the clamping forces are isolated within the clamp itself. The pulling force moving the products through the curing die is imparted to the clamps by a chain drive into which each clamp is dogged alternatively to achieve the required hand-to-hand motion, or be reciprocating ball screw, or by synchronized hydraulic cylinders attached to each clamp.

The final station in the pultrusion process is the cutoff saw (not illustrated). Usually automatic, it may include a diamond-rimmed, circular saw blade, wet-cooled and lubricated, synchronized with the movement of the pullers, and automatically actuated by a preset cut-to-length switch. The individual cut segments may then be tooled to yield the outer perimeter configuration desired such as those illustrated in FIGS. 6 and 7.

Having described a preferred embodiment of my composite suspension system it will be apparent to those skilled in the art that my invention may be modified in both arrangement and detail. Therefore the protection afforded my invention should only be limited in accordance with the scope of the following claims and reasonable equivalents thereof.

I claim:

1. A vehicle suspension system comprising:
   a pair of elongate flexible composite control arms, each having an inner end and an outer end;
   means for rigidly mounting the inner end of each of the control arms to a corresponding side of a vehicle frame transverse to a longitudinal axis of the frrame for enabling controlled and guided upward and downward flexing of an outer portion of each of the control arms;
   a pair of wheel hub assemblies each connected to the outer end of a corresponding one of the control arms; and
   a pair of shock absorbers each connected between a corresponding one of the wheel hub assemblies and the vehicle frame.

2. A vehicle suspension system according to claim 1 wherein the mounting means includes an upper curved guide surface and a lower curved guide surface for gradually engaging each of the control arms as they flex upwardly and downwardly.

3. A vehicle suspension system according to claim 2 wherein the curved guide surfaces are provided by a pair of upper and lower clamp plates which surround the inner end of each control arm.

4. A vehicle suspension system according to claim 1 and further comprising a sway bar and means for connecting opposite ends of the sway bar to the outer ends of corresponding ones of the control arms.

5. A vehicle suspension system according to claim 1 wherein each control arm is formed from a length of pultruded material made of a plurality of reinforcing fibers held together with a resin.

6. A vehicle suspension system according to claim 5 wherein the fibers are in the form of a first layer consisting of uni-directional fibers extending along the length of the control arm and a second layer consisting of a weave of fibers.

7. A vehicle suspension system according to claim 5 wherein the fibers are glass and the resin is a catalyzed thermoset resin.

8. A vehicle suspension system according to claim 1 wherein the mounting means includes an elongate rigid cross-member connected to and extending transversely across the vehicle frame, and the inner ends of the control arms are each connected to a corresponding end of the cross-member.

9. A vehicle suspension system according to claim 1 wherein each control arm has a uniform thickness and a width which gradually tapers from the inner end to the outer end thereof.

10. A vehicle suspension system according to claim 8 and further comprising a sway bar having opposite ends connected to corresponding outer ends of the control arms, and means for resiliently and rotatably connecting an intermediate segment of the sway bar to the cross-member.

11. A flexible control arm for a vehicle suspension system, comprising:
an elongate generally planar flexible member made of a composite material, the member having a substantially uniform thickness, a width that tapers down from an inner end of the member to an outer end of the member, at least one mounting hole in the inner end of the member for rigidly mounting the inner end of the member to a side of a vehicle frame transverse to a longitudinal axis of the frame and at least one mounting hole in the outer end of the member.

12. A control arm according to claim 11 wherein the composite material consists of reinforcing fibers bound together with a resin.

13. A control arm according to claim 12 wherein the fibers are glass and the resin is a catalyzed thermoset resin.

14. A control arm according to claim 13 wherein the composite material is made by pultrusion.

15. A flexible control arm for a vehicle suspension system, comprising:
an elongate generally planar member made of a composite pultrusion material, the member having a substantially uniform thickness throughout its length, a plurality of mounting holes in the inner end of the member for rigidly mounting the inner end of the member to a side of a vehicle frame transverse to a longitudinal axis of the frame and at least one mounting hole in the outer end of the member.

16. A control arm according to claim 15 wherein the composite pultrusion material is made of glass fibers and a catalyzed thermoset resin.

17. A control arm according to claim 15 wherein the composite pultrusion material has a first layer of uni-directional reinforcing fibers which extend along the length of the member and at least one secondary layer of woven reinforcing fibers.

18. A control arm according to claim 17 wherein there are a pair of the secondary layers sandwiching the first layer.

19. A control arm according to claim 15 wherein the member has a width which tapers from an inner end to an outer end of the member.

* * * * *